US005615060A

United States Patent [19]
Seki et al.

[11] Patent Number: 5,615,060
[45] Date of Patent: Mar. 25, 1997

[54] AUTOMATIC CLOCK SIGNAL PHASE ADJUSTING CIRCUIT UTILIZING LEVEL DETECTOR AND PATTERN DETECTOR

[75] Inventors: Takahito Seki, Kanagawa; Haruyuki Yoshioka, Tokyo, both of Japan

[73] Assignee: Sony Corporation, Tokyo, Japan

[21] Appl. No.: 434,064

[22] Filed: May 3, 1995

Related U.S. Application Data

[62] Division of Ser. No. 107,074, Aug. 17, 1993.

[30] Foreign Application Priority Data

Aug. 25, 1992 [JP] Japan ................................. 4-247120
Jan. 26, 1993 [JP] Japan ................................. 5-029760

[51] Int. Cl.$^6$ .............................. G11B 27/36; G11B 5/01
[52] U.S. Cl. ............................. 360/51; 360/46; 360/61; 360/65
[58] Field of Search ................................. 360/51, 64, 46, 360/61, 65; 364/602, 825; 371/45; 327/156; 375/293

[56] References Cited

U.S. PATENT DOCUMENTS 4,272,845 6/1981 Fiumani ................................. 375/293
5,210,712 5/1993 Saito ..................................... 364/825

*Primary Examiner*—Aristotelis Psitos
*Assistant Examiner*—Patrick Wamsley
*Attorney, Agent, or Firm*—William S. Frommer; Alvin Sinderbrand

[57] ABSTRACT

An automatic clock signal phase adjusting circuit for use with a digital magnetic recording and reproducing apparatus adopting a partial response class IV coding method. The automatic clock signal phase adjusting circuit comprises: a pattern detection circuit for detecting at least one of patterns "1, 0, −1" and "−1, 0, 1" from a reproduced signal; a level detection circuit for detecting the levels of the reproduced signal in effect when the pattern detection circuit detects 0's; a clock reproduction circuit for reproducing a clock signal from the reproduced signal; and a phase adjustment circuit for adjusting the phase of the clock signal reproduced by the clock reproduction circuit based on the output signal from the level detection circuit.

2 Claims, 8 Drawing Sheets

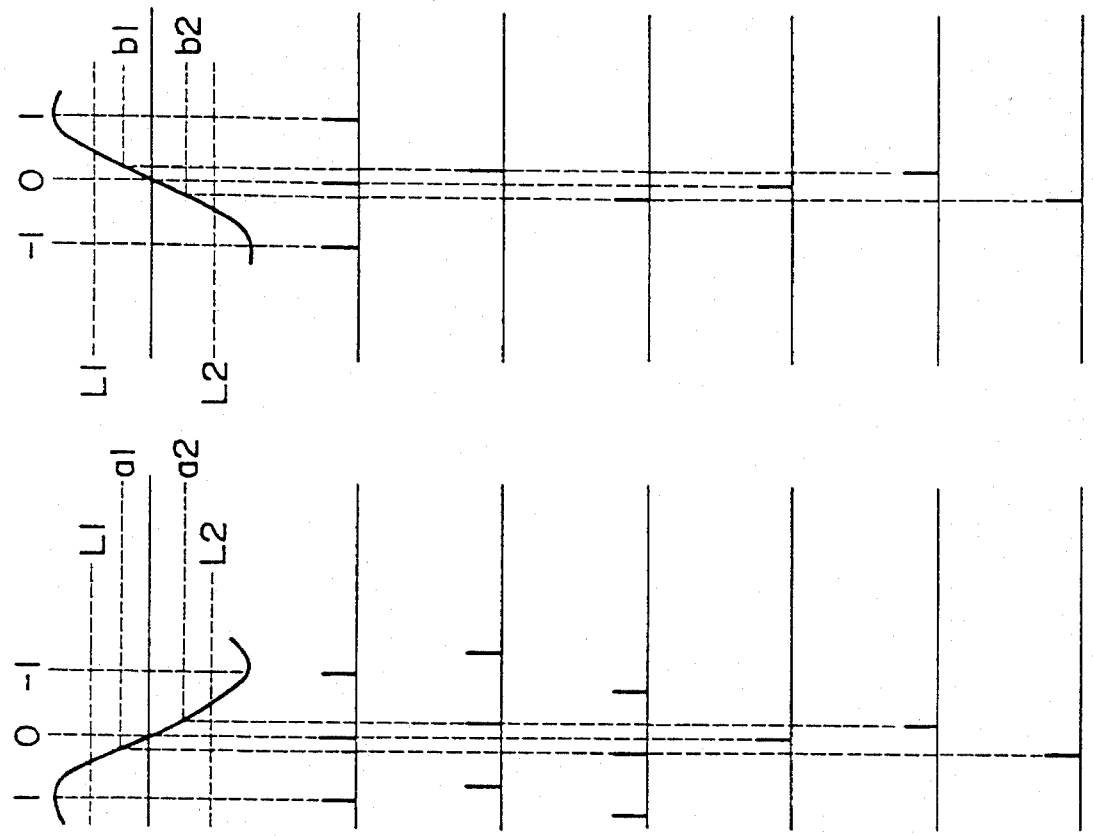

F I G. 3(a)
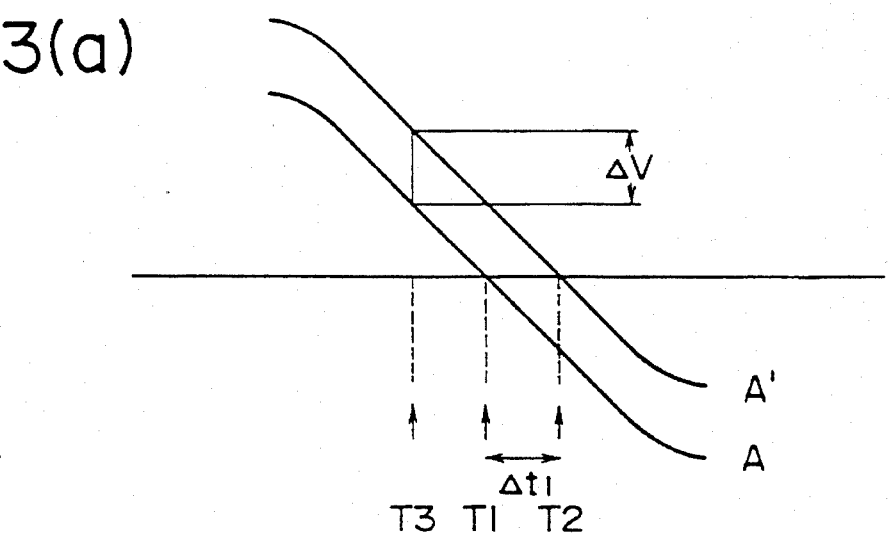
F I G. 3(b)
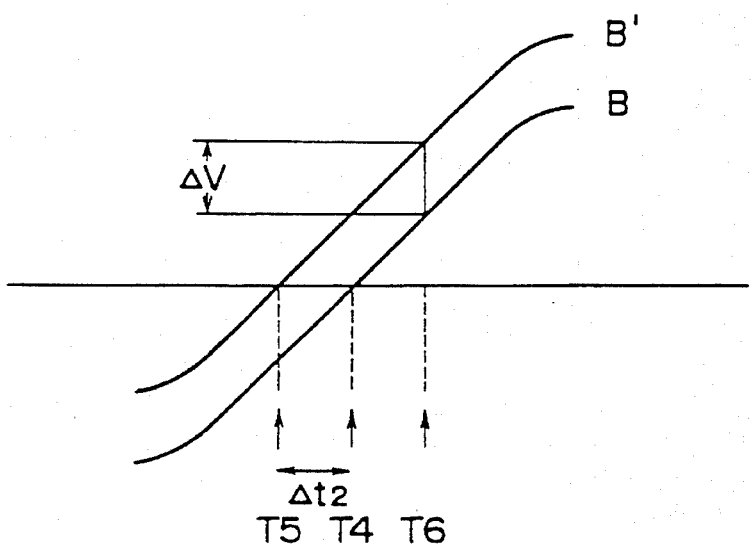
F I G. 3(c)
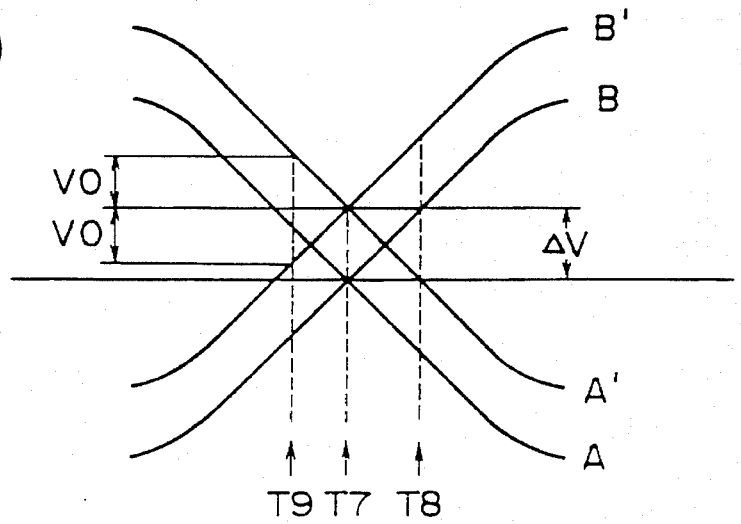

FIG. 8(a) PRIOR ART
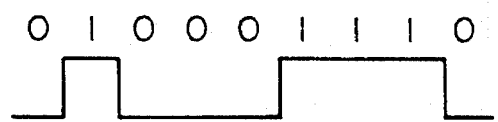
FIG. 8(b) PRIOR ART
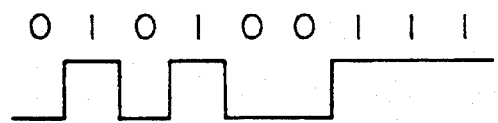
FIG. 8(c) PRIOR ART
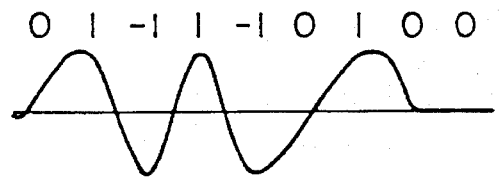
FIG. 8(d) PRIOR ART
FIG. 8(e) PRIOR ART
FIG. 8(f) PRIOR ART
FIG. 8(g) PRIOR ART
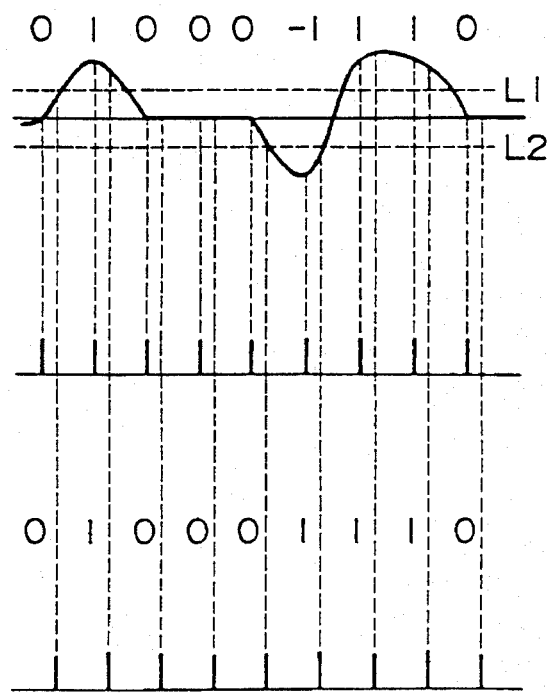
FIG. 8(h) PRIOR ART
0 1 0 0 0 0 1 1 0

AUTOMATIC CLOCK SIGNAL PHASE ADJUSTING CIRCUIT UTILIZING LEVEL DETECTOR AND PATTERN DETECTOR

This application is a division of application Ser. No. 08/107,074, filed Aug. 17, 1993.

BACKGROUND OF THE INVENTION

1. Field of the Invention

The present invention relates to an automatic clock signal phase adjusting circuit for use with a digital magnetic recording and reproducing apparatus adopting a partial response class IV coding method, the circuit adjusting the phase of a reproduced clock signal automatically.

2. Description of the Related Art

FIG. 7 is a block diagram of a prior art digital magnetic recording and reproducing apparatus adopting a partial response class IV coding method, and FIGS. 8(a) through 8(f2) are timing charts depicting the timings of signals or data used by the apparatus of FIG. 7. The timings (a) through (f2) shown in FIG. 8 correspond respectively to data or signals "a" through "f" included in FIG. 7.

In FIG. 7, a coding circuit, not shown, codes an analog video signal into coded data "a." The coded data "a" enter an input terminal 1 of a pre-coder comprising a modulo-two adder 2 and one-bit delay circuits 3 and 4. The pre-coder performs on the data "a" a partial response class IV pre-coding operation whose transfer function is $1/(1-D^2)$ for conversion to a recording code "b." The recording code "b" is supplied through a recording amplifier 5 to a recording head 6 for recording onto a magnetic tape 7.

The recording code "b" is reproduced via a reproducing head 8 and a reproducing amplifier 9. The recording head 6, magnetic tape 7 and reproducing head 8 constitute an electromagnetic conversion system whose transfer function is (1–D).

A signal from the reproducing amplifier 9 is sent through an equalizer 10 to an adder 11. The adder 11 is also fed with a signal "c" from the equalizer 10 via a one-bit delay circuit 12. The adder 11 and one-bit delay circuit 12 provide the encoding of transfer function (1+D). The pre-coder, the electromagnetic conversion system and the arrangement made of the adder 11 and one-bit delay circuit 12 combine to provide the operation:

$$1/(1-D^2) \times (1-D) \times (1+D) = 1$$

This effects the transmission of transfer function =1 and generates a ternary signal "d" pursuant to the partial response class IV coding.

The ternary signal "d" is supplied to a ternary decision circuit 13. When the signal level is between L1 (e.g., 0.5) and L2 (e.g., –0.5), the ternary decision circuit 13 recognizes 0; when the signal level is higher than L1 or lower than L2, the ternary decision circuit 13 recognizes 1. This allows the coded data in effect before pre-coding (indicated by "f") to be restored.

The recording code restored by the ternary decision circuit 13 is sent from an output terminal 14 to a decoding circuit, not shown. The decoding circuit decodes what it has received into an analog video signal.

The output signal "c" of the equalizer 10 is also fed to a PLL circuit 15 whereby a clock signal is reproduced. The reproduced clock signal is sent to a phase adjusting circuit 16 for phase adjustment. The phase adjusting circuit 16 outputs a clock signal "e" with its phase adjusted. The clock signal "e" is supplied from an output terminal 17 to various circuits as their operation clock signal.

Suppose that the clock signal "e" takes the form of (e1). In that case, the ternary decision circuit 13 samples the center portion of each bit in the ternary signal "d." As a result, the output signal "f" is a signal reconstituting the coded data "a" precisely, as shown in (f1) of FIG. 8 (f1). If the clock signal lags in phase, as indicated in FIG. 8 (e2), the ternary decision circuit 13 samples the peripheral portion of each bit in the ternary signal "d." This results in an output signal "f" containing an error, as indicated in FIG. 8 (f2). (The sixth bit from left is the error in FIG. 8 (f2)).

For these reasons, the decoded analog video signal is conventionally observed on a monitor, not shown. With the signal being monitored, the amount of phase shift produced by the phase adjusting circuit 16 is adjusted manually so that the error rate of the signal is minimized.

Manual adjustment of the clock signal phase on the conventional digital magnetic recording and reproducing apparatus involves a number of disadvantages. One such disadvantage is the need to adjust the phase frequently whenever the clock signal goes out of phase due to temperature changes. Another disadvantage is that the differences in characteristic between magnetic tapes entail a shifted phase of the clock signal reproduced by the PLL circuit from a different magnetic tape. This requires manually adjusting the phase of the clock signal every time a magnetic tape of different characteristics is reproduced.

SUMMARY OF THE INVENTION

It is therefore an object of the present invention to overcome the above and other deficiencies and disadvantages of the prior art and to provide an automatic clock signal phase adjusting circuit for use with a digital magnetic recording and reproducing apparatus, the circuit adjusting automatically the clock signal to an optimum phase.

In carrying out the invention and according to one aspect thereof, there is provided an automatic clock signal phase adjusting circuit for use with a digital magnetic recording and reproducing apparatus adopting a partial response class IV coding method, the automatic clock signal phase adjusting circuit comprising: pattern detecting means for detecting at least one of patterns "1, 0, –1" and "–1, 0, 1" from a reproduced signal; level detecting means for detecting the levels of the reproduced signal in effect when the pattern detecting means detects 0's; clock reproducing means for reproducing a clock signal from the reproduced signal; and phase adjusting means for adjusting the phase of the clock signal reproduced by the clock reproducing means based on the output signal from the level detecting means.

In a preferred structure according to the invention, the pattern detecting means detects the patterns "1, 0, –1" and "–1, 0, 1," the level detecting means detects the levels of the reproduced signal in effect when the pattern detecting means detects 0's from the two patterns, and the phase adjusting means adjusts the phase of the clock signal so that the levels of the reproduced signal will become equal.

In another preferred structure according to the invention, the automatic clock signal phase adjusting circuit, further comprises holding means for holding a DC component included in the reproduced signal, and subtracting means for subtracting the DC component held by the holding means from any one of two signals: the reproduced signal, and an input signal to the phase adjusting means.

In a further preferred structure according to the invention, the automatic clock signal phase adjusting circuit further comprises integrating means for integrating the output of the level detecting means and outputting the result to the phase adjusting means.

In operation, the phase adjusting means adjusts the phase of the clock signal optimally and automatically. In the preferred structures of the invention, the phase of the clock signal is kept optimum regardless of the presence of a DC offset component in the reproduced signal. Furthermore, the integrating means eliminates the adverse effects of the noise that may be involved. This makes it possible to adjust the clock signal phase accurately.

These and other objects, features and advantages of the invention will become more apparent upon a reading of the following description and appended drawings.

BRIEF DESCRIPTION OF THE DRAWINGS

FIGS. 2d–g3 area views illustrating how the first embodiment works in adjusting the clock signal phase;

FIGS. 3a–c are a set of views illustrating how a second embodiment works as an automatic clock signal phase adjusting circuit;

FIG. 8a–f2 are timing charts depicting the timings of signals or data used by the apparatus of FIG. 7.

DESCRIPTION OF THE PREFERRED EMBODIMENTS

The preferred embodiments of the present invention will now be described with reference to the accompanying drawings.

First Embodiment

Figure 1:
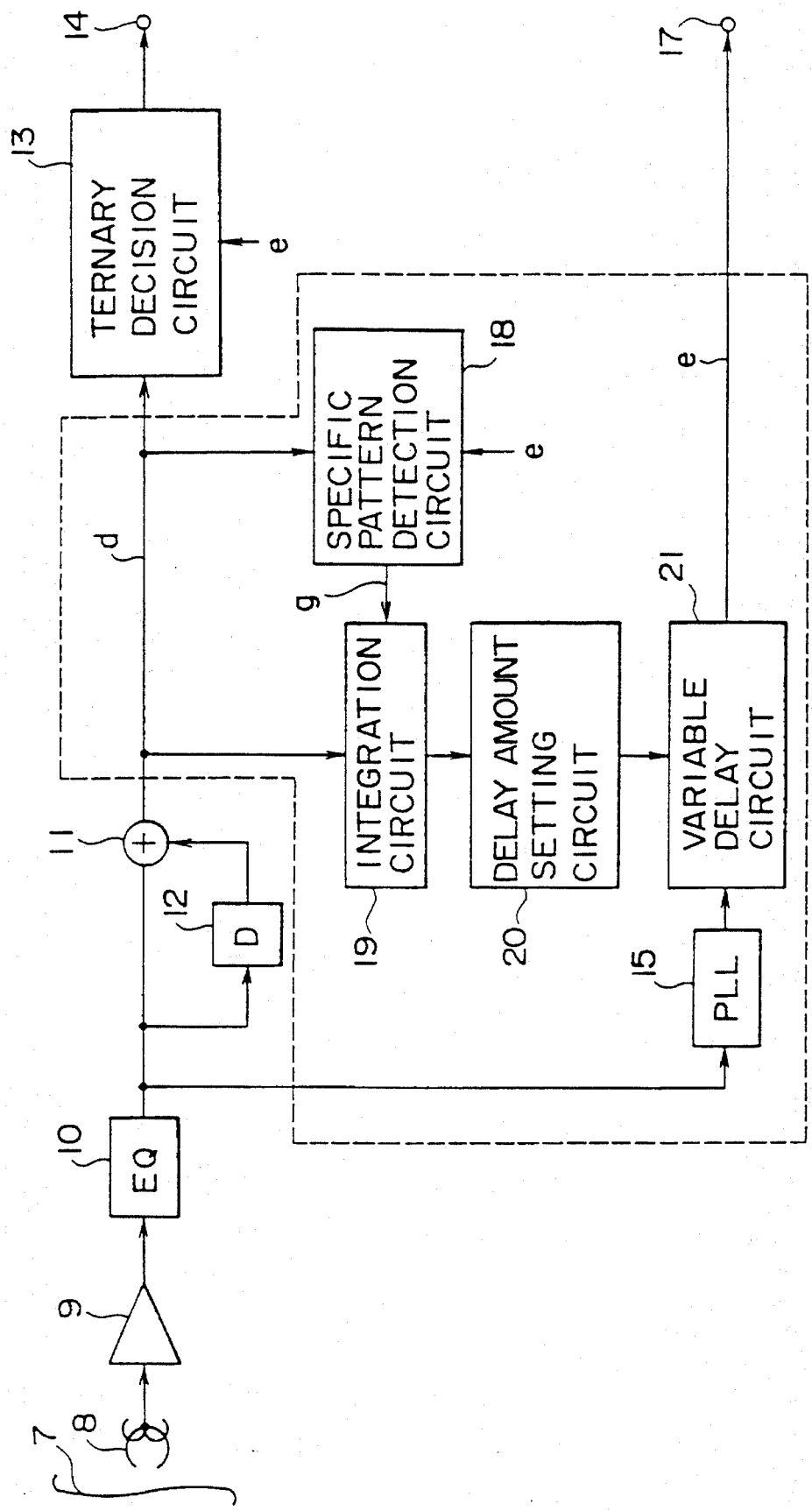
FIG. 1 is a block diagram showing key components of a reproducing system which constitutes part of a digital magnetic recording and reproducing apparatus and which includes an automatic clock signal phase adjusting circuit practiced as a first embodiment of the invention.

FIG. 1 is a block diagram showing key components of a reproducing system which constitutes part of a digital magnetic recording and reproducing apparatus and which includes an automatic clock signal phase adjusting circuit practiced as the first embodiment of the invention. The portion enclosed by broken lines in FIG. 1 is the automatic clock signal phase adjusting circuit (the same applies to the other block diagrams attached). FIGS. 2(d) through 2d3) are views illustrating how the first embodiment works in adjusting the clock signal phase. Sketches (d) through (g) correspond respectively to the data or signals "d" through "g" indicated in FIG. 1. In FIGS. 1 and 3, like reference characters designate like or corresponding parts.

What makes the first embodiment different from the reproducing system of conventional digital magnetic recording and reproducing apparatuses is that the former comprises a specific pattern detection circuit 18, an integration circuit 19, a delay amount setting circuit 20 and a variable delay circuit 21.

The specific pattern detection circuit 18 detects a portion having a pattern "1, 0, −1" or "−1, 0, 1" from a ternary signal "d," i.e., from the output of an adder 11. The integration circuit 19 integrates the values of the ternary signal "d" in effect when 0's are detected in the pattern "1, 0, −1" or "−1, 0, 1" by the specific pattern detection circuit 18. The specific pattern detection circuit 18 and the integration circuit 19 combine to detect both the amount and the direction of phase shift in the clock signal "e." How these two circuits work will be described below in more detail.

The specific pattern detection circuit 18 determines the level of the ternary signal "d" according to the timing of the clock signal "e" and thereby detects the pattern "1, 0, −1" or "−1, 0, 1." When the level of the ternary signal "d" is between L1 and L2, the specific pattern detection circuit 18 recognizes 0; when the level is greater than L1, the circuit 18 recognizes 1; when the level is lower than L2, the circuit 18 recognizes −1.

Consider first the case of detecting the pattern "1, 0, −1." In this case, if the phase of the clock signal "e" is an optimally sampled phase as shown in FIG. 2 (e1), the level of the ternary signal "d" is 0 when the specific pattern detection circuit 18 recognizes 0 and generates an output "g1" accordingly. If the phase of the clock signal "e" lags as depicted in FIG. 2 (e2), the level of the output "d" is "a2" (negative value) when the specific pattern detection circuit 18 recognizes 0 and generates an output "g2." If the phase of the clock signal "e" leads as shown in FIG. 2 (e3), the level of the output "d" is "a1" (positive value) when the specific pattern detection circuit 18 recognizes 0 and generates an output "g3."

Consider likewise the case of detecting the pattern "−1, 0, 1." If the phase of the clock signal "e" lags as shown in FIG. 2 (e2), the level of the ternary signal "d" is "b1" (positive value) when the specific pattern detection circuit 18 recognizes 0 and generates the output "g2." If the phase of the clock signal "e" leads as depicted in FIG. 2 (e3), the level of the output "d" is "b2" (negative value) when the specific pattern detection circuit 18 recognizes 0 and generates the output "g3." As described, the values in effect when the pattern "−1, 0, 1" is detected are the reverse of those in effect when the pattern "1, 0, −1" is detected. For this reason, the amount of phase shift is given by (sampled value) × (−1) when the pattern "−1, 0, 1" is detected. That is, the amount of phase shift is a positive value when the phase leads; the amount is a negative value when the phase lags.

Because the sampled values are not always precise due to the presence of noise, these values are integrated so as to obtain an averaged amount of phase shift. The integrating operation is carried out so that the value in question is added unchanged when the pattern is "1, 0, −1" and that the value is multiplied by −1 before being added when the pattern is "−1, 0, 1." The integrating time is to be determined beforehand in accordance with the S/N ratio of the reproduced signal.

According to the amount of phase shift thus obtained, the delay amount setting circuit 20 adjusts the delay amount of the variable delay circuit 21 in order to adjust the phase of the clock signal. There are two ways of adjusting the clock signal phase:

(1) Use only the direction of phase shift. Advance the phase in the positive direction and delay it in the negative direction.

(2) Use both the direction and the amount of phase shift. The greater the amount of phase shift, the higher the degree of phase compensation to be carried out.

Second Embodiment

A second embodiment of the invention is devised wherein the phase of the clock signal is optimized regardless of a DC offset component stemming from secular change or other disturbances in the signal processing circuits downstream of the equalizer.

FIGS. 3(a) through 3(c) depict how the second embodiment works as the automatic clock signal phase adjusting circuit. The operating principle of the second embodiment will now be described. Also described will be the reason why the first embodiment is incapable of optimizing the phase of the clock signal if a DC component occurs in the equalizer 10, adder 11 or one-bit delay circuit 12.

FIG. 3 (A) is a view depicting how the phase adjusting operation takes place when the specific pattern detection circuit 18 of FIG. 1 detects the pattern "1, 0, −1." In FIG. 3 (A), reference character A stands for the pattern "1, 0, −1" near 0 with no DC offset component involved. The pattern becomes linear when sufficiently close to 0. If the specific pattern detection circuit 18 receives the pattern "1, 0, −1" with no DC offset component mingled, the optimum phase of the clock signal constitutes a timing T1 where the straight line A is at the 0 level. Reference character A' denotes the pattern "1, 0, −1" near 0 with a DC offset component ΔV involved. If the specific pattern detection circuit 18 receives the pattern "1, 0, −1" with the DC offset component mingled, the optimum phase of the clock signal constitutes a timing T2 where the pattern A' is at the 0 level. That is, the clock signal phase is delayed by $$T2-T1=\Delta t_1$$

Likewise, FIG. 3 (b) is a view showing how the phase adjusting operation takes place when the specific pattern detection circuit 18 of FIG. 1 detects the pattern "−1, 0, 1." In FIG. 3 (B), reference character B stands for the pattern "−1, 0, 1" near 0 with no DC offset component involved. If the specific pattern detection circuit 18 receives the pattern "−1, 0, 1" with no DC offset component mingled, the optimum phase of the clock signal constitutes a timing T4 where the pattern B is at the 0 level. Reference character B' denotes the pattern "−1, 0, 1" near 0 with a DC offset component ΔV involved. If the specific pattern detection circuit 18 receives the pattern "−1, 0, 1" with the DC offset component mingled, the optimum phase of the clock signal constitutes a timing T5 where the straight line B' is at the 0 level. That is, the clock signal phase leads by $$T4-T5=\Delta t_2$$

As described, if the specific pattern detection circuit 18 is constructed to detect only the pattern "1, 0, −1" for adjusting the phase of the clock signal and if no DC offset component is involved, the clock signal phase is adjusted so that the clock signal will occur at the timing T1. For the pattern "−1, 0, 1," the phase coincides with the timing T4. If a DC offset component is mingled, the clock signal phase is adjusted so that the clock signal will occur at the timing T. For the pattern "−1, 0, 1, " the phase coincides with a timing T6. This means that the level of the pattern B' sampled by the ternary decision circuit 13 deviates so significantly from the 0 level that it can be judged erroneously to be 1.

Likewise, if the specific pattern detection circuit 18 is constructed to detect only the pattern "−1, 0, 1" for adjusting the phase of the clock signal and if a DC offset component is mingled, the clock signal phase is adjusted so that the clock signal will occur at the timing T5. For the pattern "1, 0, −1," the phase coincides with the timing T3. This means that the level of the pattern A' sampled by the ternary decision circuit 13 deviates so significantly from the 0 level that it can be judged erroneously to be 1.

If the specific pattern detection circuit 18 is constructed to detect both the pattern "−1, 0, 1" and the pattern "−1, 0, 1" for adjusting the phase of the clock signal, the clock signal phase cannot be optimized. This is because the direction of phase shift for one pattern is the opposite of that for the other pattern.

That is why the second embodiment is devised wherein the clock signal phase is made to coincide with the timing T1 of FIG. 3 (A) and the timing T4 of FIG. 3 (B) regardless of a DC offset component being contained in the output of the adder 11. How the second embodiment works will now be described with reference to FIG. 3 (C).

FIG. 3 (C) is prepared by overlaying the patterns A and A' in FIG. 3 (A) with the patterns B and B' in FIG. 3 (B). As can be seen in FIG. 3 (C), a timing T7 at points of intersection between A' and B' is the same as that at points of intersection between A and B. That is, the points of intersection between the patterns "1, 0, −1" and "−1, 0, 1," with or without a DC offset component, coincide with the timing of an optimum clock signal in effect when no DC offset component is involved. On the other hand, if the phase of the clock signal lags as indicated by T8, the level at which the pattern "−1, 0, 1" is sampled is raised; if the clock signal phase leads as indicated by T9, the level at which the pattern "1, 0, −1" is sampled is raised. In FIG. 3 (C), the patterns A and B are shown to be linear when close to 0 for the sake of simplicity. Even if the patterns are not linear, the result is the same as long as the patterns are symmetrical about the points of intersection on the 0 level.

Figure 4:
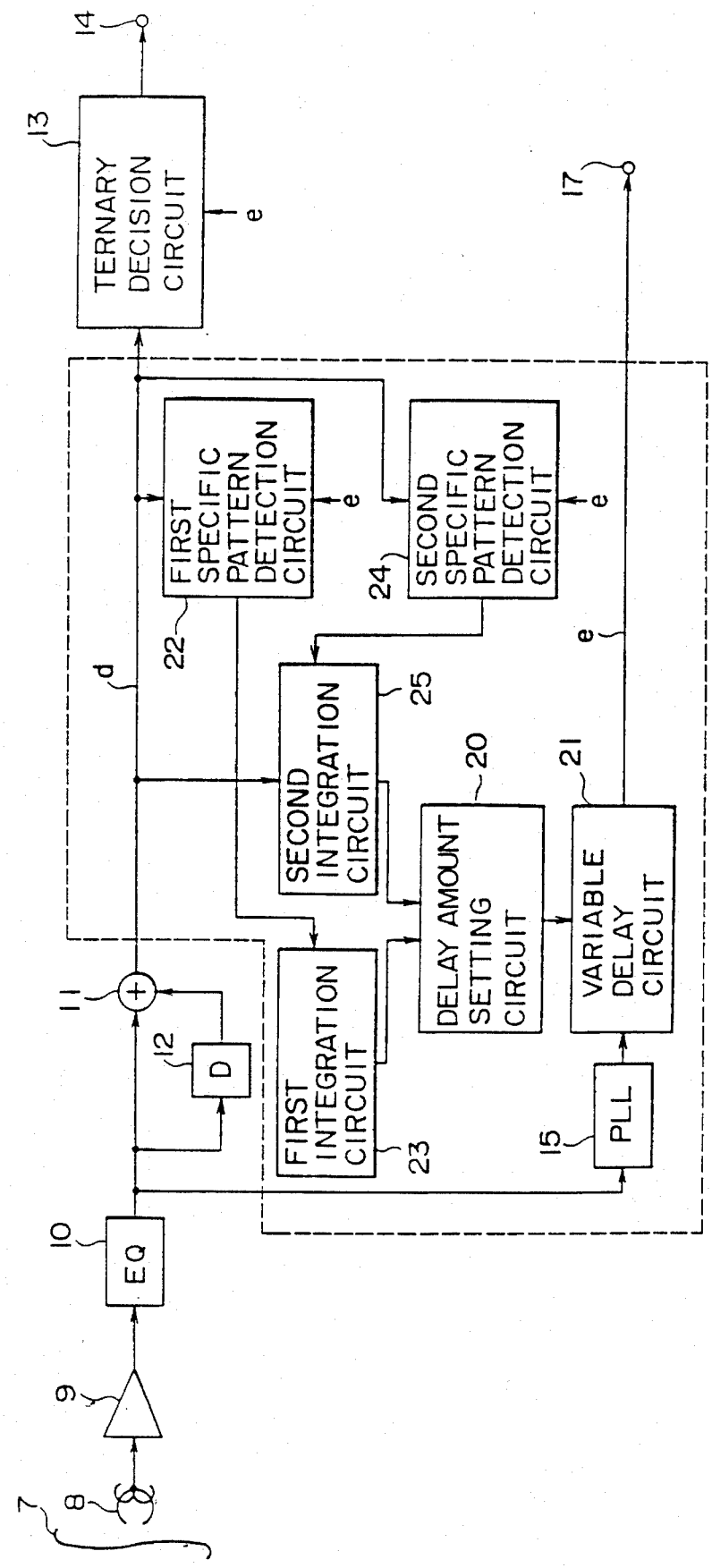
FIG. 4 is a block diagram depicting key components of a reproducing system which constitutes part of a digital magnetic recording and reproducing apparatus and which includes the automatic clock signal phase adjusting circuit practiced as the second embodiment of the invention.

FIG. 4 is a block diagram depicting key components of a reproducing system which constitutes part of a digital magnetic recording and reproducing apparatus and which includes an automatic clock signal phase adjusting circuit for the second embodiment of the invention. In FIG. 4 and FIG. 1, the latter showing the first embodiment, like reference characters designate like or corresponding parts, and repetitive descriptions of the parts in the second embodiment are omitted.

What makes the second embodiment different from the first embodiment is that the former includes a first specific pattern detection circuit 22 for detecting exclusively the pattern "1, 0, −1" and a second specific pattern detection circuit 24 for detecting only the pattern "−1, 0, 1." The circuits 22 and 24 are paired with a first integration circuit 23 and a second integration circuit 25, respectively. The first specific pattern detection circuit 22 detects a portion having the pattern "1, 0, −1" from the ternary signal "d" which is the output of the adder 11. The first integration circuit 23 integrates values of the ternary signal "d" in effect at timings of 0's in the pattern "1, 0, −1." Likewise, the second specific pattern detection circuit 24 detects a portion having the pattern "−1, 0, 1" from the ternary signal "d." The second integration circuit 25 integrates values of the ternary signal "d" in effect at timings of 0's in the pattern "−1, 0, 1." The delay amount setting circuit 20 adjusts the delay time of the variable delay circuit 21 so that the output level of the first integration circuit 23 will equal that of the second integration circuit 25. How the second embodiment operates will now be described with reference to FIG. 3 (C) and FIG. 4.

Suppose that a ternary signal having a DC offset component ΔV shown in FIG. 3 is input to the first and the second specific pattern detection circuits 22 and 24 for sampling at the timing T9. In that case, the value entering the first integration circuit 23 is ΔV+V0, and the value input to the second integration circuit 25 is ΔV−V0, where V0 is a voltage generated when the timing of the sampling deviates from the optimum timing T7.

As can be seen in FIG. 3 (C), the sign and the absolute value of V0 represent the direction and the amount of phase shift from the optimum sampling phase. Using the direction and the amount of phase shift, the delay amount setting circuit 20 adjusts the delay time of the variable delay circuit 21 so that the output level of the first integration circuit 23 will equal that of the second integration circuit 25. As a result, $$\Delta V + V0 = \Delta V - V0$$

Therefore, $$V0 = 0$$

Thus the operations above are performed so that the phase of the clock signal coincides with the optimum sampling phase T7.

When the clock signal is adjusted to the optimum sampling phase, the patterns "1, 0, −1" and "−1, 0, 1" still share the ΔV level at the timing 0. This could raise the possibility of a specific pattern detection circuit recognizing 1 erroneously when the threshold value for judging ΔV to be 0 or 1 is exceeded. However, using a Viterbi decoder as the ternary decision circuit 13 makes it possible to establish the threshold value based on predicted data, which reduces the possibility of erroneous judgment significantly.

Third Embodiment

Figure 5:
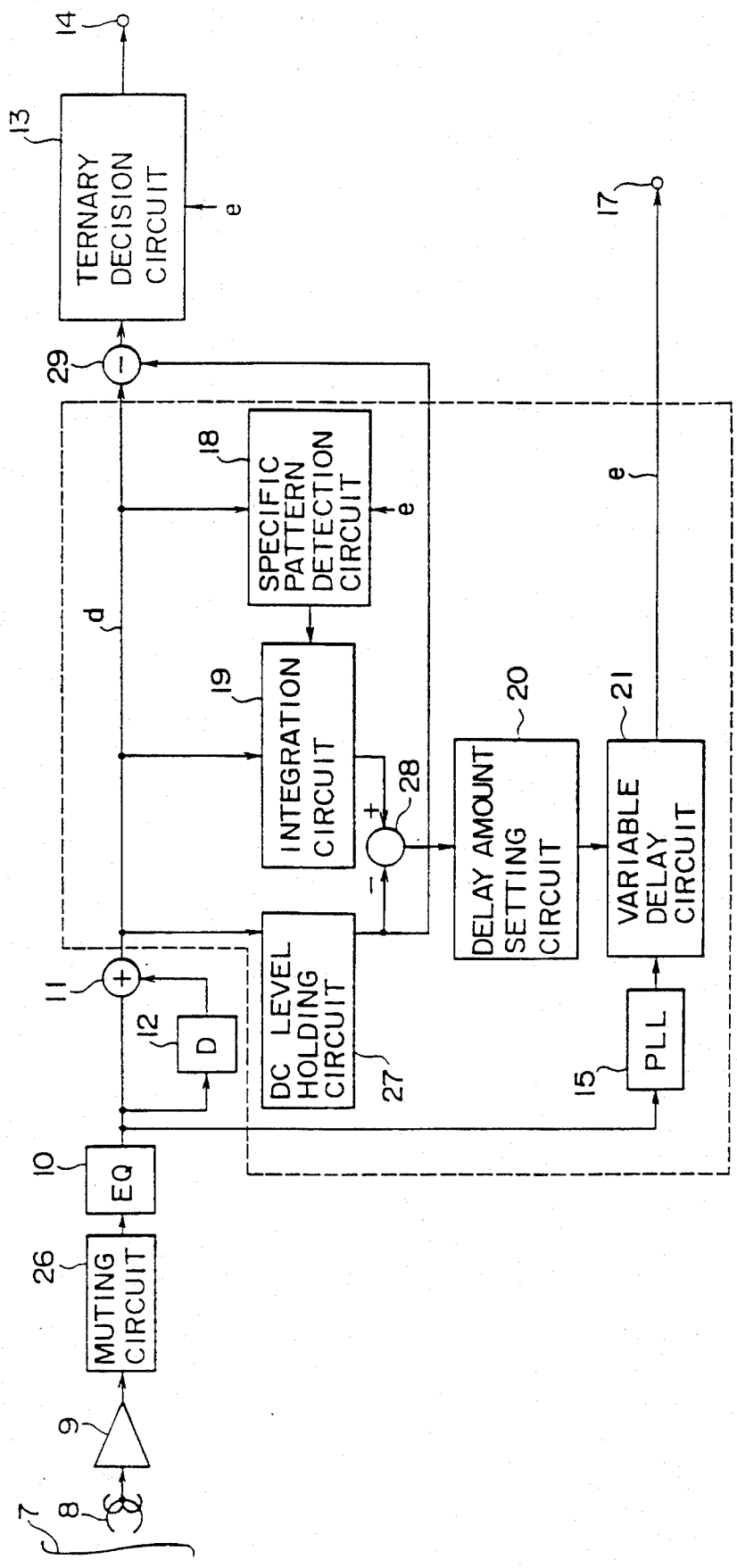
FIG. 5 is a block diagram depicting key components of a reproducing system which constitutes part of a digital magnetic recording and reproducing apparatus and which includes an automatic clock signal phase adjusting circuit practiced as a third embodiment of the invention.

A third embodiment of the invention is devised wherein the DC offset component is measured and subtracted so as to eliminate the adverse effects of that component. Key parts of the third embodiment are outlined below with reference to FIG. 5. In FIG. 5 and FIG. 1, the latter showing the first embodiment, like reference characters designate like or corresponding parts, and repetitive descriptions of the parts in the third embodiment are omitted.

What makes the third embodiment different from the first embodiment is that the former includes a muting circuit 26 that mutes the output of the reproducing amplifier 9, a DC level holding circuit 27 that holds the level of the ternary signal "d" in effect when the muting circuit 26 is operating, a subtracter 28 that subtracts the output signal of the DC level holding circuit 27 from the output signal of the integration circuit 19, and a subtracter 29 that subtracts the output signal of the DC level holding circuit 27 from the ternary signal "d." How the third embodiment works will now be described.

When no reproduced signal is needed from a magnetic tape 7 (e.g., when the tape 7 is stopped), the muting circuit 26 is activated to mute the output signal of the reproducing amplifier 9. At this point, the ternary signal "d" from the adder 11 consists only of the DC offset component ΔV generated by the equalizer 10, adder 11 and one-bit delay circuit 12. The level of the signal "d" is held by the DC level holding circuit 27. Where an AC component such as noise is overlaid on the ternary signal "d" while the muting circuit 26 is active, the DC level holding circuit 27 is equipped with a filter function to remove the AC component.

In normal reproduction where the muting circuit 26 remains inactive, a DC offset component is overlaid on the ternary signal "d." In this case, if the specific pattern detection circuit 18 receives the pattern "1, 0, −1" denoted by A' in FIG. 3 (A), the value at the timing 0 in the pattern "1, 0, −1" is the sum of the DC offset component ΔV and the voltage V0 generated by a phase shift. The subtracter 28 then subtracts the DC offset component ΔV held in the DC level holding circuit 27. This turns the pattern "1, 0, −1" effectively into the pattern A shown in FIG. 3 (A). That is, the value in effect at the timing 0 consists only of the voltage V0 generated by the phase shift. The adverse effects of the DC offset component are thus removed.

Furthermore, the third embodiment has its subtracter 29 subtract the DC offset component ΔV from the ternary signal "d" so that the DC offset component ΔV does not occur at the timing 0 in the patterns "1, 0, −1" and "−1, 0, 1."

Fourth Embodiment

Figure 6:
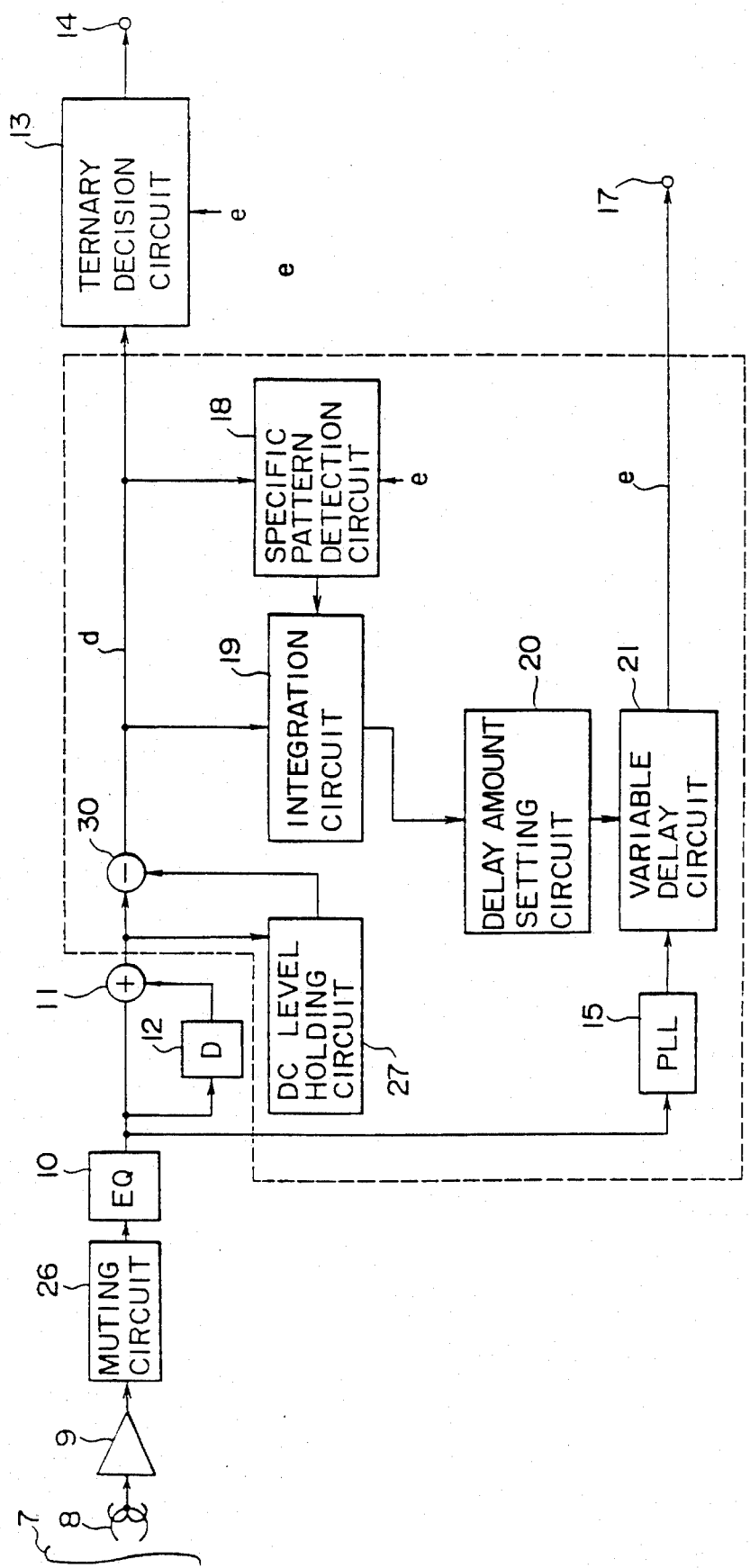
FIG. 6 is a block diagram depicting key components of a reproducing system which constitutes part of a digital magnetic recording and reproducing apparatus and which includes an automatic clock signal phase adjusting circuit practiced as a fourth embodiment of the invention.
Figure 7:
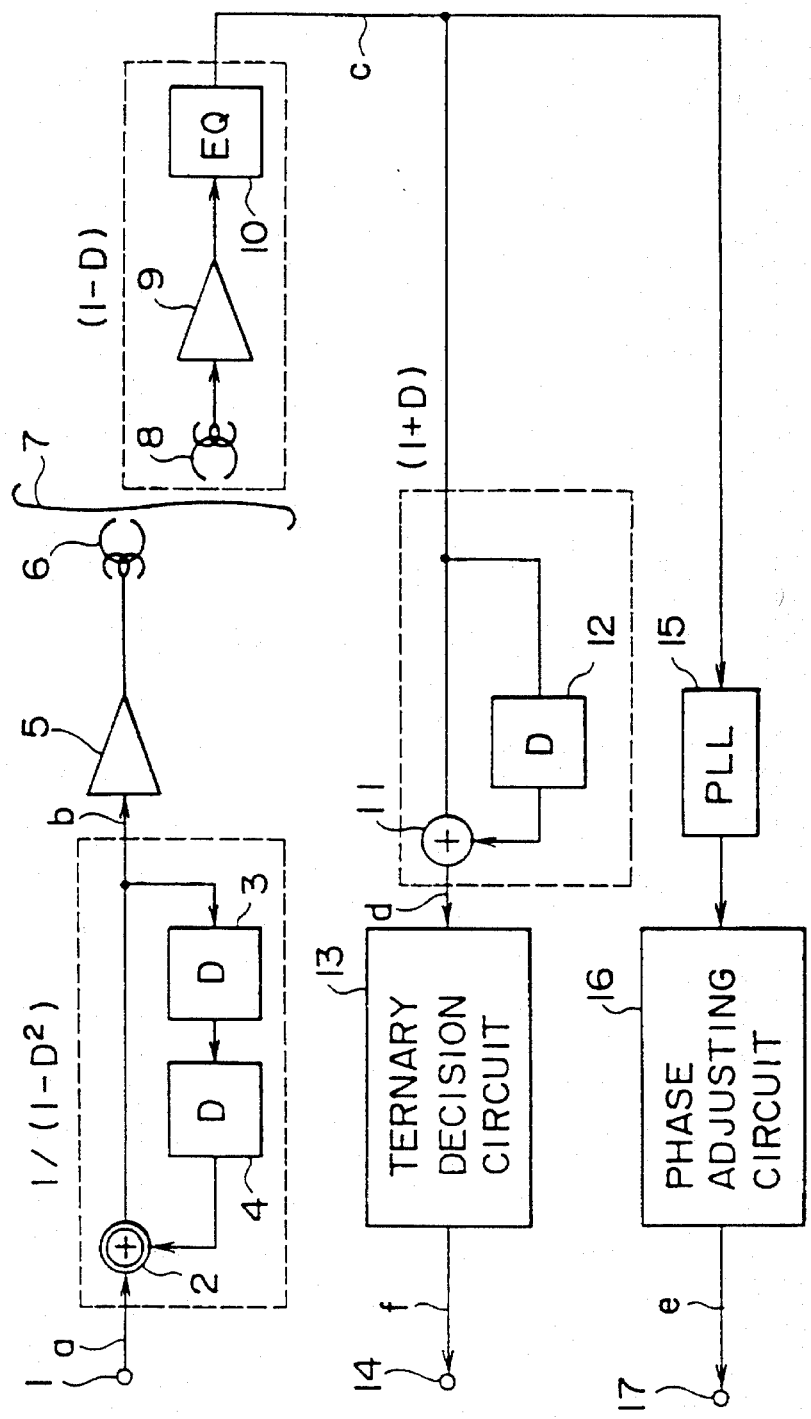
FIG. 7 is a block diagram of a typical prior art digital magnetic recording and reproducing apparatus adopting a partial response class IV coding method.

A fourth embodiment of the invention is devised wherein the DC offset component is measured and subtracted from the output of the adder 11 whereby the adverse effects of that component are removed. Key parts of the fourth embodiment are outlined below with reference to FIG. 6. In FIG. 6 and FIG. 5, the latter showing the third embodiment, like reference characters designate like or corresponding parts, and repetitive descriptions of the parts in the fourth embodiment are omitted.

The fourth embodiment includes a subtracter 30 that subtracts the DC offset component ΔV held in the DC level holding circuit 27 from the ternary signal "d" which is the output of the adder 11. If the adder 11 outputs the pattern "1, 0, −1" designated by A' in FIG. 3 (A), the subtracter 30 performs subtraction of the DC offset component ΔV so that the output of the subtracter 30 becomes equivalent to the pattern A in FIG. 3 (A). As a result, the signal processing circuits downstream of the subtracter 30 receive signals free of the DC offset component.

As described above in detail, the automatic clock signal phase adjusting circuit optimizes the phase of the clock signal automatically so as to keep the error rate minimized. When a temperature change occurs or when a magnetic tape of different characteristics is reproduced, the phase of the clock signal is kept optimized.

With the adverse effects of the DC offset component or of the noise component eliminated, the phase of the clock signal is adjusted precisely.

Furthermore, the invention allows the phase of the clock signal to be left unadjusted or to be merely adjusted coarsely when digital magnetic recording and reproducing apparatuses are mass-produced. This makes it possible to shorten the adjusting time significantly at the mass production stage.

Although the description above contains many specificities, these should not be construed as limiting the scope of the invention but as merely providing illustrations of some of the presently preferred embodiments of this invention. For example, instead of each of the above-described embodiments disposing a ternary decision circuit and a specific pattern detection circuit in separate blocks, the two circuits may alternatively share the parts for comparing the level of the ternary signal "d" with L1 and/or L2. Another possible modification is to forego the integration process. Instead, the pattern "1, 0, −1" may be fed unchanged to the delay amount setting circuit 20 while the pattern "−1, 0, 1" may be multiplied by −1 before being sent to the circuit 20.

A further modification is to furnish an A/D converter downstream of the reproducing amplifier 9, the converter being followed by digital processing circuits. In this setup, the digital processing circuits may be implemented by hardware or by software.

An alternative to the third embodiment is to forego the arrangement of the subtracter 29 subtracting the DC offset component. Instead, the threshold value for the ternary decision circuit 13 may be controlled in accordance with the output signal of the DC level holding circuit 27.

Thus the scope of the invention should be determined by the appended claims and their legal equivalents, rather than by the examples given.

What is claimed is:

1. An automatic clock signal phase adjusting circuit for use with a digital magnetic recording and reproducing apparatus adopting a partial response class IV coding method, said automatic clock signal phase adjusting circuit comprising:

an input for receiving a reproduced signal reproduced from a magnetic recording medium;

a muting circuit coupled with the input to selectively supply one of the reproduced signal and a mute output at an output thereof;

an equalizer circuit having an input coupled with the output of the muting circuit and an output;

an adder having a first input coupled with the output of the equalizer circuit, a second input and an output;

a one-bit delay circuit having an input coupled with the output of the equalizer circuit and an output coupled with the second input of the adder;

holding means for holding a DC component obtained from the output of the adder when the muting circuit supplies the mute output at its output;

subtracting means for subtracting the DC component held by the holding means from a signal output by the adder when the muting circuit supplies the reproduced signal at its output, to produce a difference signal;

pattern detecting means for detecting at least one of patterns "1, 0, −1" and "−1, 0, 1" present in the difference signal;

level detecting means for detecting levels of said difference signal in effect when said pattern detecting means detects 0's to produce an output signal representing the detected levels;

clock reproducing means for reproducing a clock signal obtained from said magnetic recording medium; and phase adjusting means for adjusting the phase of said clock signal reproduced by said clock reproducing means based on the output signal from said level detecting means.

2. An automatic clock signal phase adjusting circuit according to claim 1, wherein the level detecting means comprises integrating means for integrating the difference signal and outputting the result to said phase adjusting means as said output signal.

* * * * *